United States Patent
Noad et al.

(10) Patent No.: US 10,558,436 B2
(45) Date of Patent: Feb. 11, 2020

(54) DYNAMICALLY COMPOSING PRODUCTS USING CAPSULES

(71) Applicant: ADP, LLC, Roseland, NJ (US)

(72) Inventors: Richard Benjamin Noad, Montclair, NJ (US); Nicholas James Ford, East Brent (GB); Paul James Levitt, Street (GB); Martin John Wilson, Denville, NJ (US)

(73) Assignee: ADP, LLC, Roseland, NJ (US)

( * ) Notice: Subject to any disclaimer, the term of this patent is extended or adjusted under 35 U.S.C. 154(b) by 257 days.

(21) Appl. No.: 15/005,492

(22) Filed: Jan. 25, 2016

(65) Prior Publication Data

US 2017/0212734 A1    Jul. 27, 2017

(51) Int. Cl.
*G06F 8/36* (2018.01)

(52) U.S. Cl.
CPC ..................... *G06F 8/36* (2013.01)

(58) Field of Classification Search
CPC .................................................. G06F 8/20–78
See application file for complete search history.

(56) References Cited

U.S. PATENT DOCUMENTS

| | | | |
|---|---|---|---|
| 6,122,647 A * | 9/2000 | Horowitz | G06F 17/30873 707/999.003 |
| 6,637,020 B1 | 10/2003 | Hammond | |
| 7,424,717 B2 | 9/2008 | Blevins | |
| 7,707,040 B2 | 4/2010 | Lakhotia et al. | |
| 8,271,935 B2 * | 9/2012 | Lewis | G06F 8/10 717/104 |
| 9,002,342 B2 * | 4/2015 | Tenhunen | G06F 8/60 455/419 |
| 9,497,313 B2 * | 11/2016 | Kinoshita | G06F 8/38 |
| 2004/0049481 A1 * | 3/2004 | Blevins | G06Q 10/06 |
| 2007/0130156 A1 * | 6/2007 | Tenhunen | G06F 8/60 |
| 2010/0011338 A1 * | 1/2010 | Lewis | G06F 8/10 717/105 |
| 2011/0035706 A1 * | 2/2011 | Kinoshita | G06F 8/38 715/835 |
| 2012/0016833 A1 * | 1/2012 | Janiesch | G06Q 10/067 706/50 |
| 2014/0033171 A1 * | 1/2014 | Lorenz | G06F 8/34 717/121 |

* cited by examiner

*Primary Examiner* — Bing Zhao
(74) *Attorney, Agent, or Firm* — Yee & Associates, P.C.

(57) ABSTRACT

A method and apparatus for dynamically composing applications is presented. A computer system identifies a set of parameters based on user input. The computer system then activates a portion of a plurality of capsules stored in a data storage to form a set of activated capsules based on the set of parameters. Further, the computer composes an application in real-time using a base capsule and the set of activated capsules in which the application is specifically tailored for a particular state. The application and the plurality of capsules take up a reduced amount of memory space.

20 Claims, 9 Drawing Sheets

DYNAMICALLY COMPOSING PRODUCTS USING CAPSULES

BACKGROUND INFORMATION

1. Field

The present disclosure relates generally to providing products, such as web applications, to users. More particularly, the present disclosure relates to a method and apparatus for dynamically composing products in real-time using capsules that are organized based on an inheritance structure.

2. Background

With the marketplace for software products becoming more and more global, creating and managing customized software products is becoming increasingly difficult and time-consuming. For example, a global business entity may desire to use a single human resources application to manage human resources in all offices in various countries. However, it may be desirable to customize the graphical user interface of that human resources application for users based on country of residence, country of employment, or some type of other country-based factor.

With some currently available applications, different versions of the human resource application may need to be deployed for the users residing in different countries. For example, when a user in the United States wants to access the human resources application, a full copy of a United States version of the human resources application may be deployed. When a user in a different country, such as Spain, wants to access the human resources application, another full copy of a Spain version of the human resources application may be deployed. The variations between these two versions of the human resources application may need to be precomputed.

Precomputing, or predefining, the various versions of the human resources application needed for different situations may be, in some cases, preemptively or prohibitively difficult, time-consuming, labor-intensive, expensive, or some combination thereof. Further, the processing resources, such as memory space and power, required to manage all of these different versions of the human resources application may be greater than desired. Therefore, it would be desirable to have a method and apparatus that take into account at least some of the issues discussed above, as well as other possible issues.

SUMMARY

In one illustrative embodiment, a method for dynamically composing applications is presented. A computer system identifies a set of parameters based on user input. The computer system then activates a portion of a plurality of capsules stored in a data storage to form a set of activated capsules based on the set of parameters. Further, the computer composes an application in real-time using a base capsule and the set of activated capsules in which the application is specifically tailored for a particular state. The application and the plurality of capsules take up a reduced amount of memory space.

In another illustrative embodiment, a method for dynamically building an application in real-time is presented. A computer system identifies a context as defined by a set of parameters based on user input. The computer system then selects at least a portion of a plurality of capsules based on the context to form a set of selected capsules. Further, the computer system selects at least a portion of a plurality of data objects in each selected capsule of the set of selected capsules based on the context to form a set of selected data objects for each selected capsule. Still further, the computer system identifies a capsule order for applying the set of selected capsules to build a product and an object order for applying the set of selected data objects in each selected capsule to build the application. Still yet further, the computer system activates each selected capsule of the set of selected capsules according to the capsule order identified to form a set of activated capsules, wherein each selected data object of the set of selected data objects in each selected capsule is activated according to the object order identified when each selected capsule is activated. Further, the computer system composes the application in real-time using the set of activated capsules. The application is tailored for a particular state based on the context.

In yet another illustrative embodiment, an apparatus comprises a data storage that stores a plurality of capsules, and a computer system that identifies a set of parameters based on user input. Further, the computer system activates a portion of a plurality of capsules stored in the data storage to form a set of activated capsules. Still further, the computer system dynamically composes an application in real-time using a base capsule and the set of activated capsules in which the application is specifically tailored for a particular state. The application and the plurality of capsules take up a reduced amount of memory space.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for dynamically composing products, such as web applications, in real-time. In particular, it may be desirable to compose a product, such as a web application, that is customized for a user at the time of use.

The illustrative embodiments provide a method and apparatus for dynamically composing products, such as, but not limited to, web applications. In one illustrative example, a computer system is used to identify a set of parameters based on user input. The computer system may activate a portion of a plurality of capsules stored in a data storage to form a set of activated capsules. The computer system may compose an application in real-time using a base capsule and the set of activated capsules. The application may be specifically tailored for a particular situation or state. The application and the plurality of capsules may take up a reduced amount of memory space. As one illustrative example, the base capsule and the plurality of capsules may enable dynamically composing the application in real-time for a plurality of states using less memory space than storing code for a plurality of versions of the application for the plurality of states.

Figure 1:
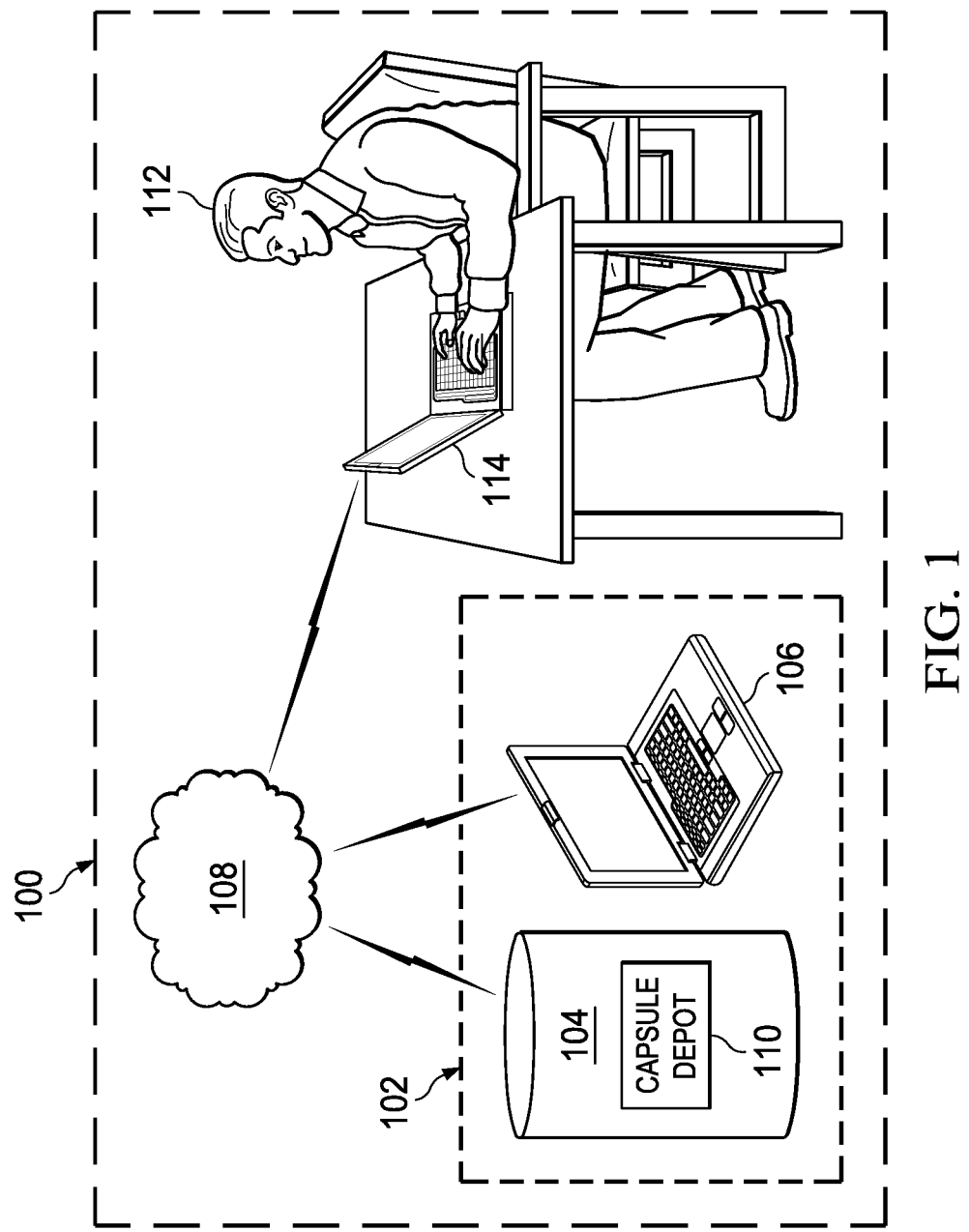
FIG. 1 is an illustration of a product development environment in accordance with an illustrative embodiment.

Referring now to the figures and, in particular, with reference to FIG. 1, an illustration of a product development environment is depicted in accordance with an illustrative embodiment. In this illustrative example, product development environment 100 includes product management system 102. Product management system 102 may be used to dynamically compose products for end users in real-time, as needed.

In one illustrative example, product management system 102 includes data storage 104 and computer system 106. Computer system 106 may comprise a single computer or a plurality of computers that are in communication with each other. Data storage 104 may be implemented in different ways. For example, without limitation, data storage 104 may be implemented using at least one of a data structure, a database, a memory device, a neural network, an associative memory, or some other type of data storage.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

In this illustrative example, computer system 106 and data storage 104 are in communication with each other. In some cases, data storage 104 may be implemented as part of computer system 106. In other illustrative examples, computer system 106 may be in communication with data storage 104 through network 108. Network 108 may take the form of the Internet, some other type of computer network, a communications network, or a combination thereof.

Capsule depot 110 may be stored in data storage 104. Capsule depot 110 may be a collection of capsules for composing one or more different products, such as, but not limited to, web applications. Capsules are described in greater detail in FIG. 2 below.

For example, without limitation, user 112 may use computer 114 to access a web application that is managed by product management system 102. In particular, computer 114 may gain access to the web application through network 108. In this illustrative example, user input may be used to define criteria that may then be used to compose the web application on-the-fly for user 112.

Figure 2:
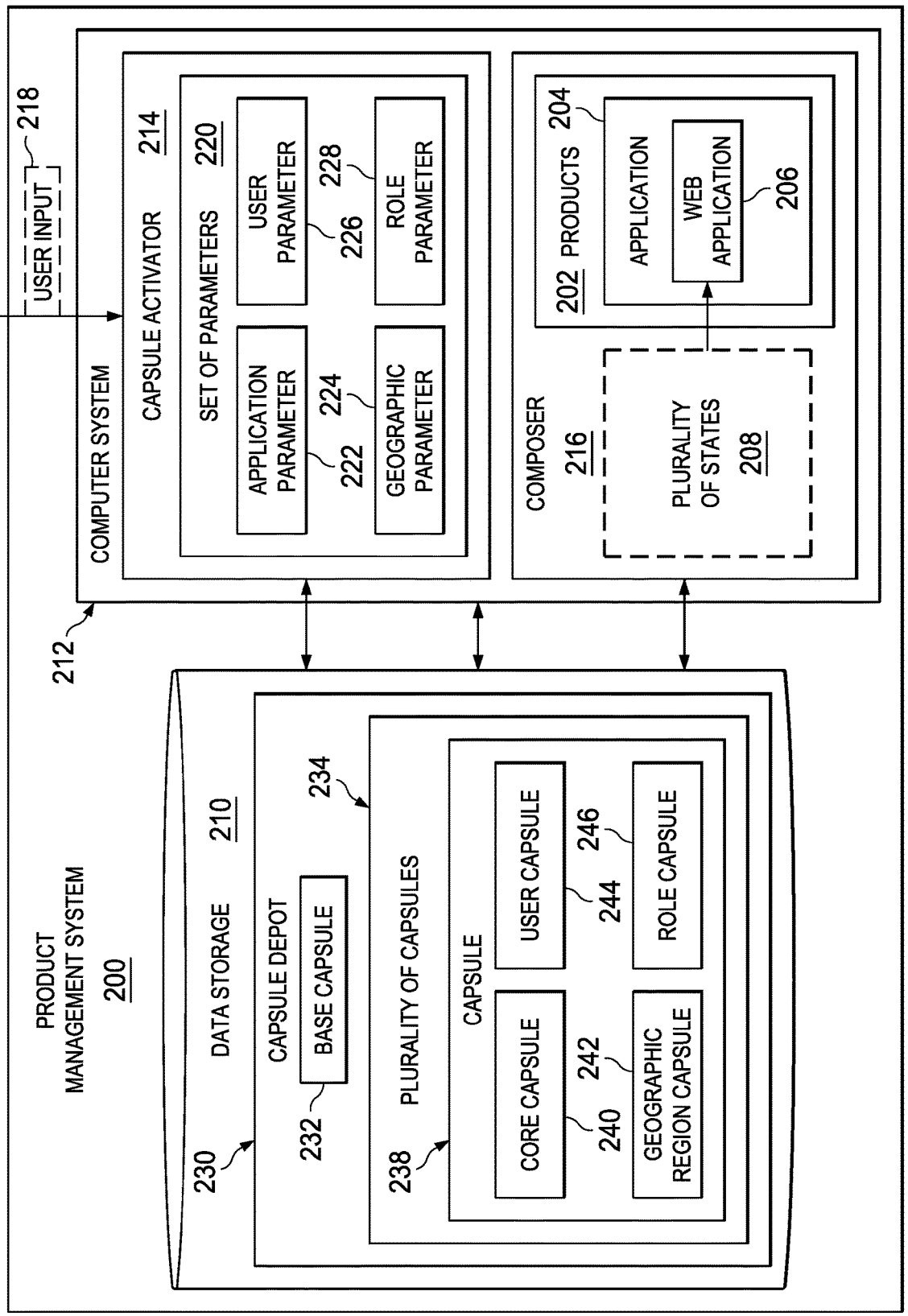
FIG. 2 is an illustration of a product management system in the form of a block diagram in accordance with an illustrative embodiment.

With reference now to FIG. 2, an illustration of a product management system is depicted in the form of a block diagram in accordance with an illustrative embodiment. Product management system 102 in FIG. 1 may be an example of one implementation for product management system 200 in FIG. 2.

In this illustrative example, product management system 200 is used to manage products 202. Products 202 may be software products. Application 204 may be an example of one of products 202. Application 204 is a software application. In one illustrative example, application 204 takes the form of web application 206.

Web application 206 may take different forms. For example, without limitation, product management system 200 may be managed by an entity. This entity may be a business entity, an organization, a corporation, a firm, a team, or some other type of entity. In one illustrative example, the entity may be a business entity that provides products 202 related to human resource information. In this example, web application 206 may take the form of a human resources application, a payroll application, a salary and benefits application, a talent management application, or some other type of web application.

Product management system 200 enables the dynamic composition of web application 206 for plurality of states 208. A state, such as one of plurality of states 208, means a particular situation or set of circumstances.

As depicted, product management system 200 includes data storage 210 and computer system 212. Data storage 104 and computer system 106 in FIG. 1 may be examples of implementations for data storage 210 and computer system 212, respectively, in FIG. 2.

Data storage 210 may be implemented using, for example, without limitation, at least one of a data structure, a database, a memory device, a neural network, an associative memory, or some other type of data storage. Computer system 212 may comprise a single computer or a plurality of computers that are in communication with each other.

In one illustrative example, product management system 200 includes capsule activator 214 and composer 216 that are implemented in computer system 212. Capsule activator 214 and composer 216 may each be implemented using software, hardware, firmware, or a combination thereof. When software is used, the operations performed by capsule activator 214, composer 216, or both, may be implemented using, for example, without limitation, program code configured to run on a processor unit. When firmware is used, the operations may be implemented using, for example, without limitation, program code and data stored in persistent memory to run on a processor unit.

When hardware is employed, the hardware may include one or more circuits that operate to perform the operations performed by capsule activator 214, composer 216, or both. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

Capsule activator 214 receives and processes user input 218. User input 218 may be received through, for example, without limitation, a graphical user interface. Based on user input 218, capsule activator 214 identifies set of parameters 220. As used herein, a "set of" items includes one or more items. In this manner, set of parameters 220 may include one or more parameters.

A parameter in set of parameters 220 may be one of various predefined types. For example, without limitation, set of parameters 220 may include at least one of application parameter 222, geographic parameter 224, user parameter 226, role parameter 228, or some other type of parameter. Other examples of parameters may include, but are not limited to, parameters for country, employment position, company department, industry, technical field, gender, religion, and other types of parameters.

In one illustrative example, application parameter 222 may identify a type for web application 206 that is to be composed. For example, application parameter 222 may identify whether web application 206 to be composed is a human resources application, a payroll application, or some other type of web application.

Geographic parameter 224 may identify a geographic region. In some cases, this geographic region may be a location for the user providing user input 218. The location may be identified as a city, a county, a state, a country, or some combination thereof. In other examples, when web application 206 is a human resources application, the geographic region may be one in which the person about whom information is to be accessed through web application 206 is located.

User parameter 226 may identify the user who provides user input 218. Role parameter 228 may identify the role of the user. In particular, role parameter 228 may identify the role of the user with respect to the current request for access to web application 206. For example, without limitation, role parameter 228 may identify whether a user is trying to access web application 206 as a supervisor, an employee, a manager, a director, an administrator, or as having some other role.

Capsule depot 230 may be stored in data storage 210. Capsule depot 230 may comprise a collection of capsules that are used to compose products 202.

A capsule may be thought of as a logical and/or abstract grouping of building blocks for building a product, such as an application, under various contexts. These building blocks may be data objects. A particular product is not fixed in terms of which data objects from which capsules are used. In other words, different combinations of capsules and different combinations of the data objects from those capsules may be used to build different versions of a particular product for a plurality of states.

In one illustrative example, a capsule may be defined by a software developer to include a logical and/or abstract grouping of data objects. In particular, a capsule may comprise one or more data objects. A data object may be an object defined and interpreted by a domain specific language (DSL) for use in building a product, such as web application 206. A data object may be used to build, for example, without limitation, a portion of a graphical user interface, a field in a graphical user interface, or a visual appearance of a portion of a graphical user interface. In some cases, a data object may be used to define at least one of a rule, an algorithm, an action, or some other process for a product.

Depending on the implementation, a data object may belong to more than one capsule. For example, without limitation, a first portion of a data object may belong to a first capsule and a second portion of this data object may belong to a second capsule. Thus, the data object in a capsule may take the form of a partial data object or a complete data object. In some illustrative examples, a portion of a data object may belong to one capsule and that same portion may belong to another capsule.

In one illustrative example, capsule depot 230 includes base capsule 232 and plurality of capsules 234. In one illustrative example, base capsule 232 may be the only capsule that is always used to build a product. For example, base capsule 232 may be the foundation for building that particular product. Plurality of capsules 234 may be used to customize that product based on set of parameters 220. In other illustrative examples, some set of base capsules may be the only capsules used to always build a product.

Capsule 238 is an example of one of plurality of capsules 234. Capsule 238 may take the form of core capsule 240, geographic region capsule 242, user capsule 244, role capsule 246, or some other type of capsule when used for composing web application 206. In some cases, capsule 238 may take the form of a customization capsule or some other type of capsule. In one illustrative example, plurality of capsules 234 may include a plurality of core capsules, a plurality of geographic region capsules, a plurality of user capsules, a plurality of role capsules, and a plurality of customization capsules. Each of the plurality of customization capsules may be used to customize the product based on at least one parameter.

Capsule activator 214 uses set of parameters 220 to determine which of plurality of capsules 234 are to be selected for composing web application 206. In particular, capsule activator 214 may activate a portion of plurality of capsules 234 to form a set of activated capsules that are then used to compose web application 206. Activating a capsule means that this capsule may now be used to build application 206. An activated capsule is one from which one or more data objects may be selected to build application 206.

Web application 206 may be dynamically built based on the context created by set of parameters 220. This context determines which capsules will be activated by capsule activator 214. Further, this context determines which data objects are selected from within each activated capsule. Still further, this context is used to determine the order in which each activated capsule is applied to form web application 206 and the order in which each selected data object is applied from each activated capsule.

Figure 3:
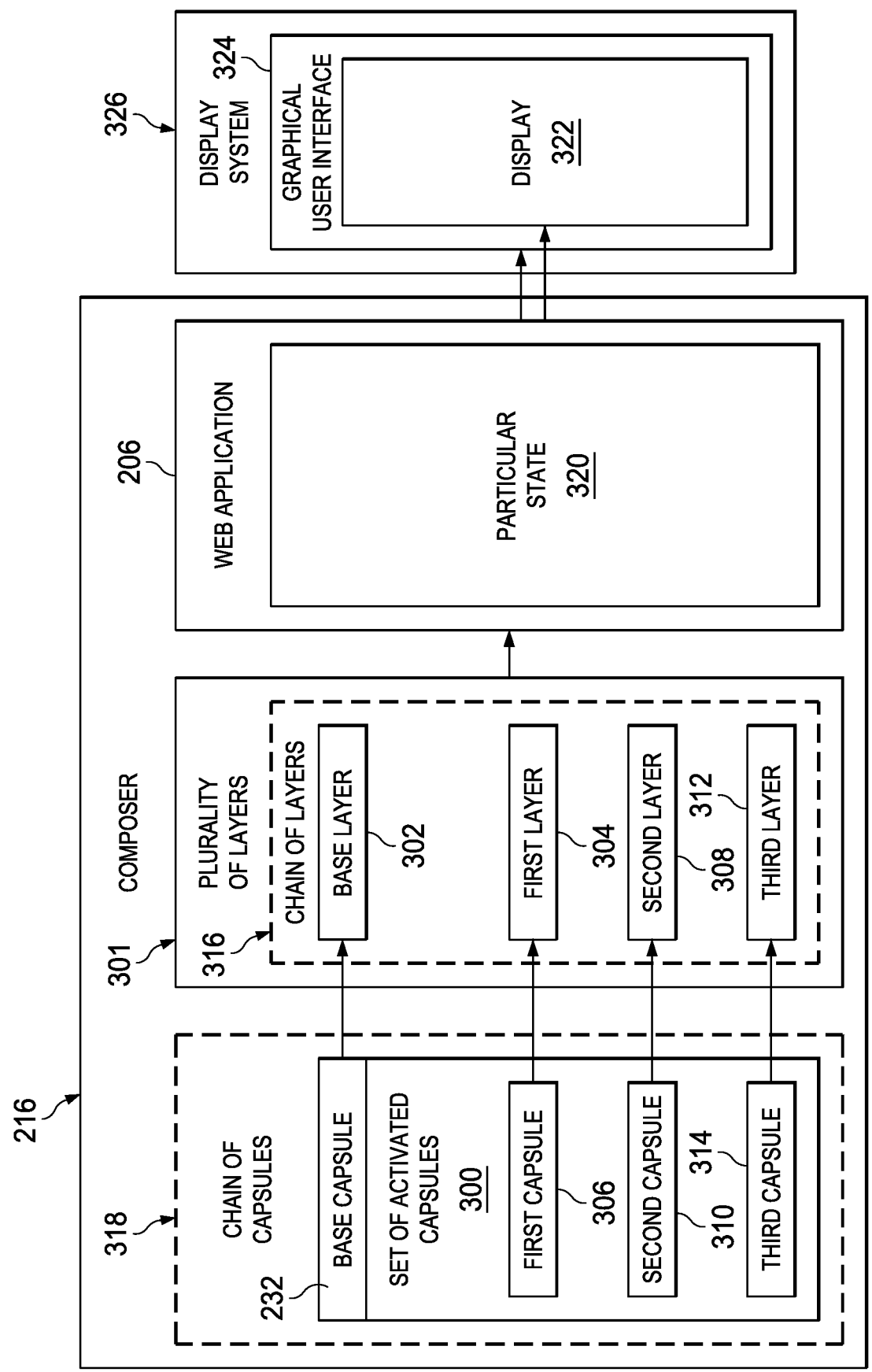
FIG. 3 is an illustration of a composer in the form of a block diagram in accordance with an illustrative embodiment.

With reference now to FIG. 3, an illustration of composer 216 from FIG. 2 is depicted in the form of a block diagram in accordance with an illustrative embodiment. Composer 216 may be used to compose web application 206 based on set of activated capsules 300 that are activated by capsule activator 214 in FIG. 2.

In one illustrative example, composer 216 uses base capsule 232 and set of activated capsules 300 to build plurality of layers 301 for web application 206. For example, composer 216 may use base capsule 232 to build base layer 302. Composer 216 may then define first layer 304 for use in composing web application 206 using first capsule 306. First capsule 306 inherits base capsule 232 such that first layer 304 inherits base layer 302.

Composer 216 then defines second layer 308 using second capsule 310. Second capsule 310 inherits first capsule 306 such that second layer 308 inherits first layer 304. Composer 216 may also define third layer 312 using third capsule 314. Third capsule 314 inherits second capsule 310 such that third layer 312 inherits second layer 308. Any number of layers may be created in this manner.

In this illustrative example, third layer 312 may be a final layer and may be an integration of base layer 302, first layer 304, and second layer 308. In particular, third layer 312 may be defined by the same definition used for second layer 308 but modified as needed by the data objects in third capsule 314. Second layer 308 may be defined by the same definition used for first layer 304 but modified as needed by the data objects in second capsule 310. Further, first layer 304 may be defined by the same definition used for base layer 302 but modified as needed by the data objects in first capsule 306.

In this manner, chain of layers 316 based on chain of capsules 318 is used to build web application 206 that is tailored or customized for particular state 320. Particular state 320 may be a situation or set of circumstances as defined by parameters identified through user input.

In one illustrative example, composer 216 visually presents web application 206 to a user in display 322 in graphical user interface 324. Graphical user interface 324 may be displayed on display system 326. Display system 326 may be comprised of one or more display devices, depending on the implementation.

The illustrations of product management system 200 in FIG. 2 and composer 216 in FIGS. 2-3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 4:
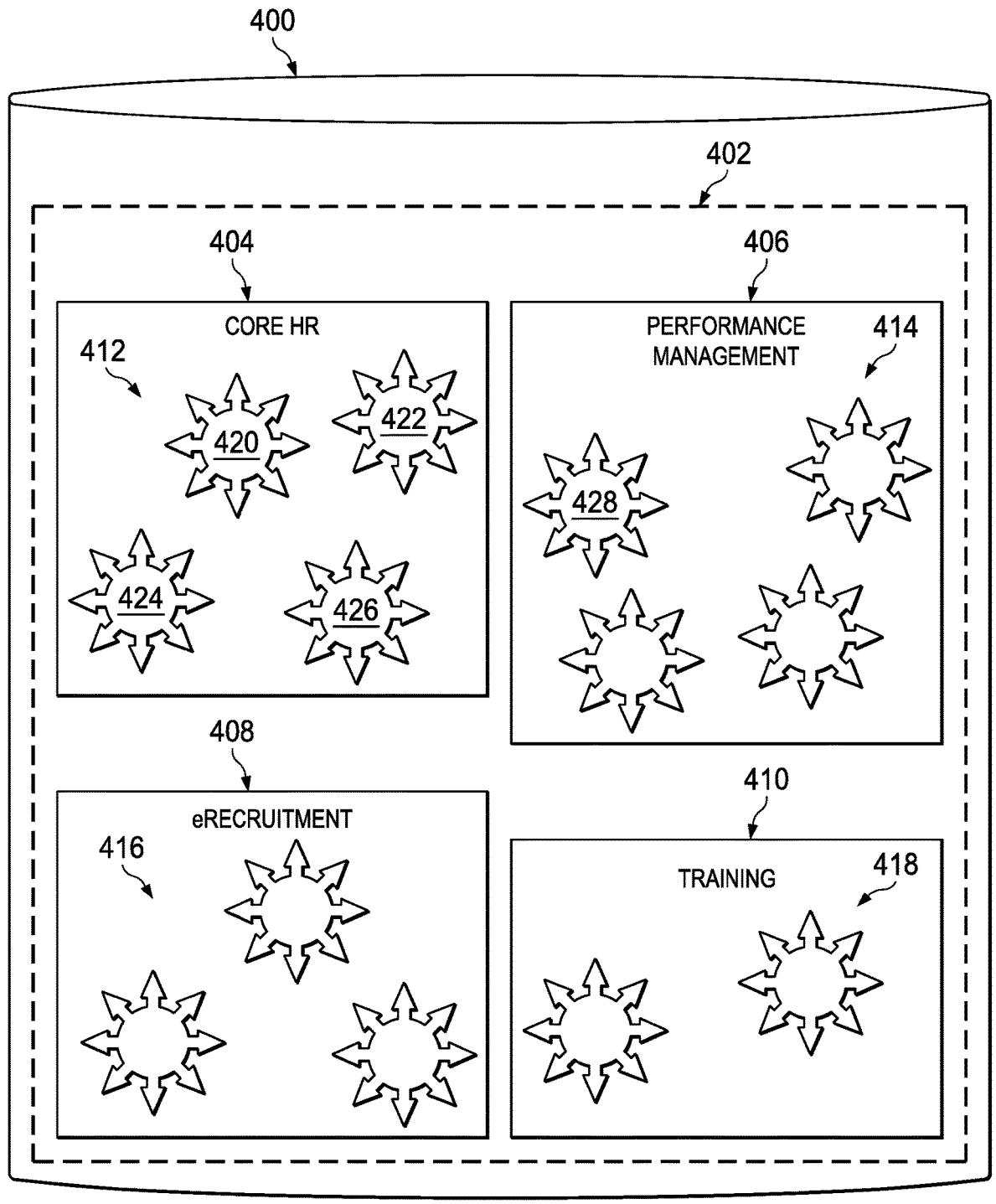
FIG. 4 is an illustration of a data storage in accordance with an illustrative embodiment.

With reference now to FIG. 4, an illustration of a data storage is depicted in accordance with an illustrative embodiment. Data storage 400 may be an example of one implementation for data storage 210 in FIG. 2.

Data storage 400 stores capsule depot 402. Capsule depot 402 includes core human resources capsule 404, performance management capsule 406, electronic recruitment capsule 408, and training capsule 410. Each of core human resources capsule 404, performance management capsule 406, electronic recruitment capsule 408, and training capsule 410 includes one or more objects. In this illustrative example, core human resources capsule 404, performance management capsule 406, electronic recruitment capsule 408, and training capsule 410 include data objects 412, data objects 414, data objects 416, and data objects 418, respectively.

A data object in core human resources capsule 404, performance management capsule 406, electronic recruitment capsule 408, or training capsule 410 may be a complete data object or a partial data object. For example, without limitation, a data object may be divided among more than one capsule. As one illustrative example, data object 428 in performance management capsule 406 may include a portion of a particular data object. Data object 422 in core human resources capsule 404 may include another portion of that particular data object.

Figure 5:
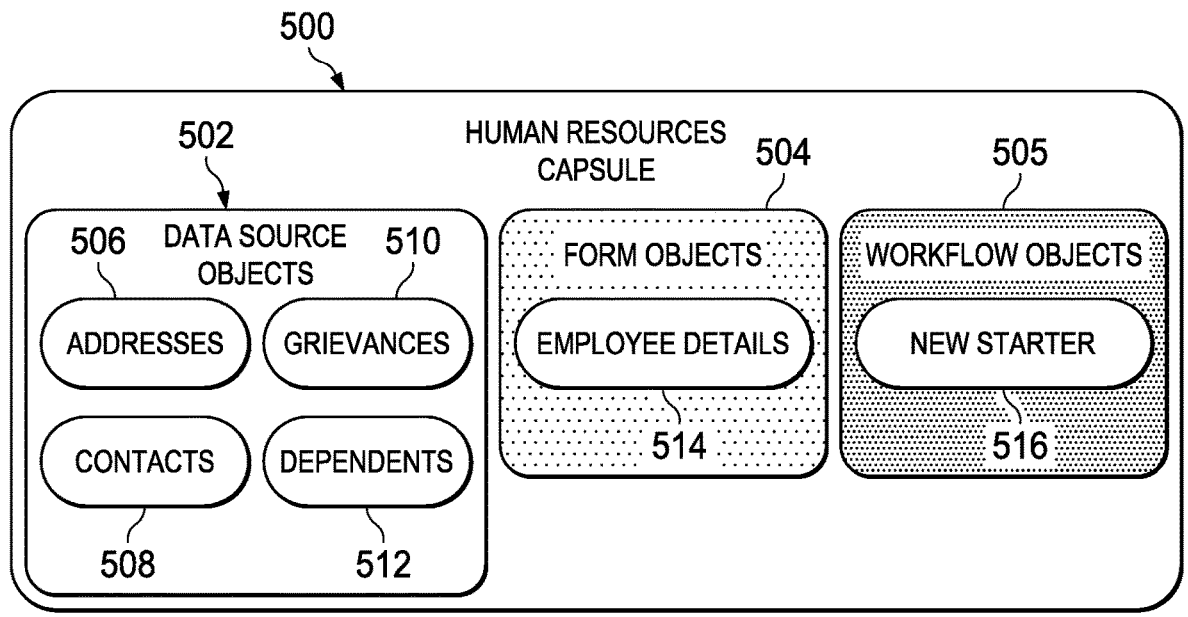
FIG. 5 is an illustration of a human resources capsule in accordance with an illustrative embodiment.

With reference now to FIG. 5, an illustration of a human resources capsule is depicted in accordance with an illustrative embodiment. In this illustrative example, human resources capsule 500 may be an example of one implementation for capsule 238 in FIG. 2.

As depicted, human resources capsule 500 includes data objects that are grouped into data source objects 502, form objects 504, and workflow objects 505. In other illustrative examples, human resources capsule 500 may include other types of data object such as, but not limited to, picklist objects, lookup objects, report objects, chart objects, data export definition objects, import definition objects, and other types of data objects.

Data source objects 502 include, but are not limited to, addresses 506, contacts 508, grievances 510, and dependents 512. In one illustrative example, each address of addresses 506 may be a data object; each contact of contacts 508 may be a data object; each grievance of grievances 510 may be a data object; and each dependent of dependents 512 may be a data object.

As one illustrative example, an address data object of addresses 506 may be a document in a document-based database. Addresses 506 may be a collection of these documents. In another illustrative examples, addresses 506 may be a collection of address records that are stored in a relational database or in a table.

Form objects 504 may include, but are not limited to, employee details 514. Workflow objects 505 may include, but are not limited to, new starter 516.

In one illustrative example, an application may call for displaying employee details, which may include home addresses. Employee details 514, which is a form object, may be applied to create the form that displays these employee details. This form may then require one or more of data source objects 502 to provide the actual data. For example, addresses 506 may be used to provide the home address of a particular employee.

Additionally, other business rules may be applied to addresses 506. For example, addresses 506, which may be a document as described above, may include business rules that indicate that a United States address is to be displayed differently than a German address or a South African address.

In other illustrative examples, business rules may be part of some other type of capsule. For example, a business rule capsule may include multiple business rule data objects, one of which may be designated for the display of addresses.

Figure 6:
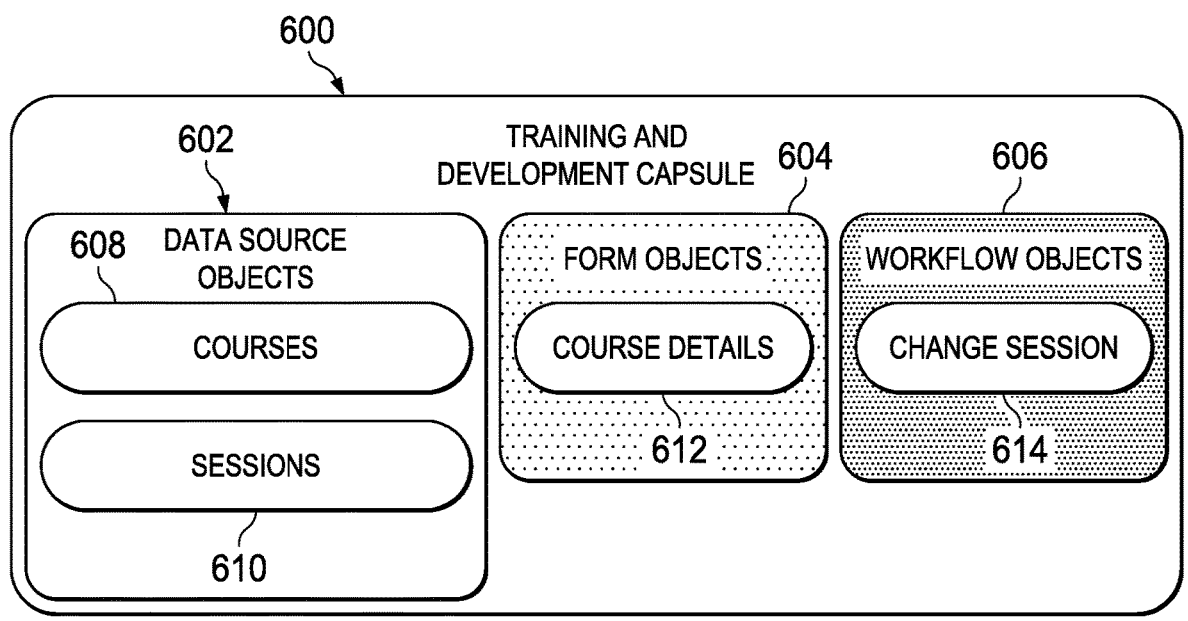
FIG. 6 is an illustration of a training and development capsule in accordance with an illustrative embodiment.

With reference now to FIG. 6, an illustration of a training and development capsule is depicted in accordance with an illustrative embodiment. In this illustrative example, training and development capsule 600 may be an example of one implementation for capsule 238 in FIG. 2.

As depicted, training and development capsule 600 includes data objects that are grouped into data source objects 602, form objects 604, and workflow objects 606. In other illustrative examples, training and development capsule 600 may include other types of data object such as, but not limited to, picklist objects, lookup objects, report objects, chart objects, data export definition objects, import definition objects, and other types of data objects.

Data source objects 602 include, but are not limited to, courses 608 and sessions 610. Further, form objects 604 may include, but are not limited to, course details 612. Workflow objects 606 may include, but are not limited to, change session 614.

Figure 7:
FIG. 7 is an illustration of a display for a graphical user interface in accordance with an illustrative embodiment.

With reference now to FIG. 7, an illustration of a display for a graphical user interface is depicted in accordance with an illustrative embodiment. In this illustrative example, display 700 may be an example of one implementation for display 322 in FIG. 3 that may be visually presented in a graphical user interface. Display 700 visually presents a human resources application to a user. In particular, display 700 may visually present a human resources application that has been customized for employees that are geographically located in the United States.

Display 700 includes employee information section 702. Employee information section 702 includes reference number section 704, title section 706, first name section 708, last name section 710, date of birth section 712, gender section 714, and religion section 716.

Reference number section 704 has field 718 that identifies a reference number of a particular employee. Title section 706 has field 720 that identifies a title of the employee. Date of birth section 712 has field 722 that identifies a date of birth for the employee. Date of birth section 712 also includes calendar control 724 that allows a user to view the date of birth in a miniature calendar view.

First name section 708 and last name section 710 have field 726 and field 728, respectively, that identify the first name and last name, respectively, of the employee. Gender section 714 includes field 730 that identifies the gender of the employee. Religion section 716 has field 732 that identifies the religious preference of the employee.

Field 718, field 720, field 722, field 726, field 728, field 730, and field 732 may be implemented in a manner that allows a user to modify the values within these fields. Display 700 also includes save button 734 and cancel button 736.

Figures 8, 9:
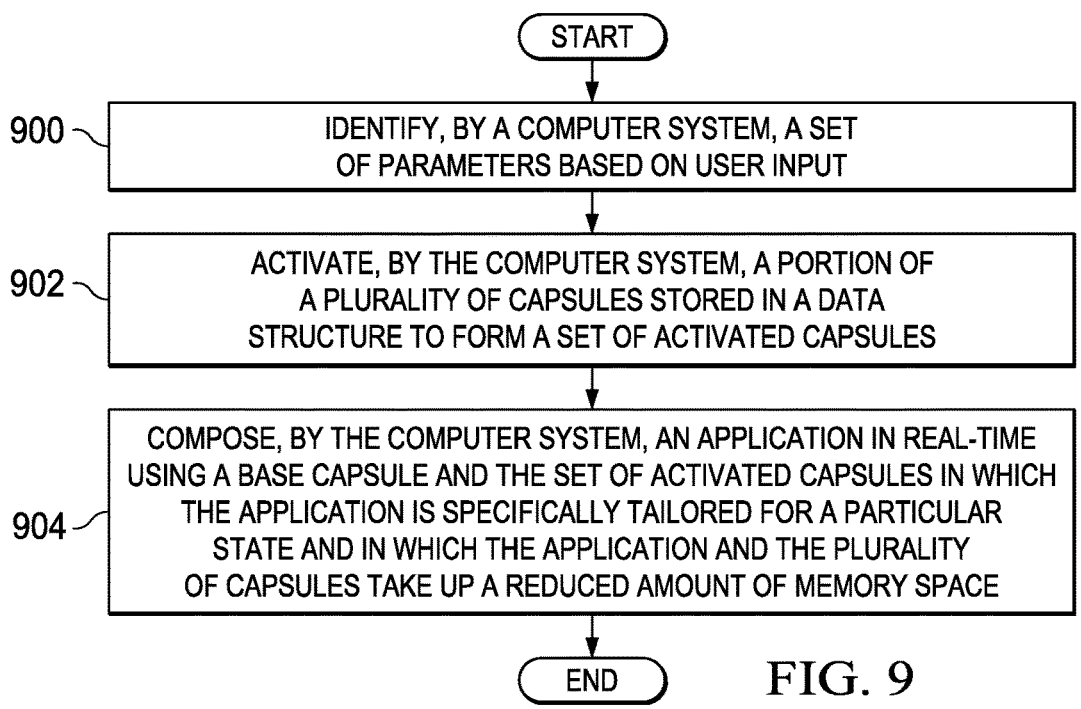
FIG. 8 is an illustration of a display for a graphical user interface in accordance with an illustrative embodiment.
FIG. 9 is an illustration of a process for dynamically composing an application in the form of a flowchart in accordance with an illustrative embodiment.

With reference now to FIG. 8, an illustration of display 700 from FIG. 7 is depicted in accordance with an illustrative embodiment. In this illustrative example, display 700 has been modified. In particular, display 700 may visually present a human resources application that has been customized for employees that are geographically located in Germany, a geographical region in which religious preference is not tracked. Consequently, display 700 does not include religion section 716 from FIG. 7. In other illustrative examples, gender section 714 may not be included in display 700 in FIG. 8.

In particular, in this illustrative example, a capsule activator, such as capsule activator 214 in FIG. 2, may determine a context for the human resources application based on user input. This context indicates that the employee is from Germany. In Germany, religion is not a required field for employee information. In one illustrative example, the capsule activator may apply a business rule object for German employees from within a business rule capsule to the human resources application to control how display 700 is rendered in a graphical user interface.

In some illustrative examples, caching may be extensively used. For example, the context may be cached, the order in which activated capsules are applied for this context may be cached, the order in which data objects within activated capsules are applied for this context may be cached, or a combination thereof may be cached. In some cases, the display format to be used for this context may be cached. When another employee logs into the human resources application having the same context, the same cached display format may be used to display the employee information for that employee in the graphical user interface.

With reference now to FIG. 9, an illustration of a process for dynamically composing an application is depicted in the form of a flowchart in accordance with an illustrative embodiment. The process illustrated in FIG. 9 may be used to compose a product, such as web application 206 in FIG. 2. Further, the process illustrated in FIG. 9 may be implemented using, for example, without limitation, capsule activator 214 and composer 216 implemented in computer system 212 in FIG. 2.

The process begins by identifying, by a computer system, a set of parameters based on user input (operation 900). Next, the computer system activates a portion of a plurality of capsules stored in a data structure to form a set of activated capsules (operation 902). Thereafter, the computer system composes an application in real-time using a base capsule and the set of activated capsules in which the application is specifically tailored for a particular state in which the application and the plurality of capsules take up a reduced amount of memory space (operation 904), with the process terminating thereafter.

Figure 10:
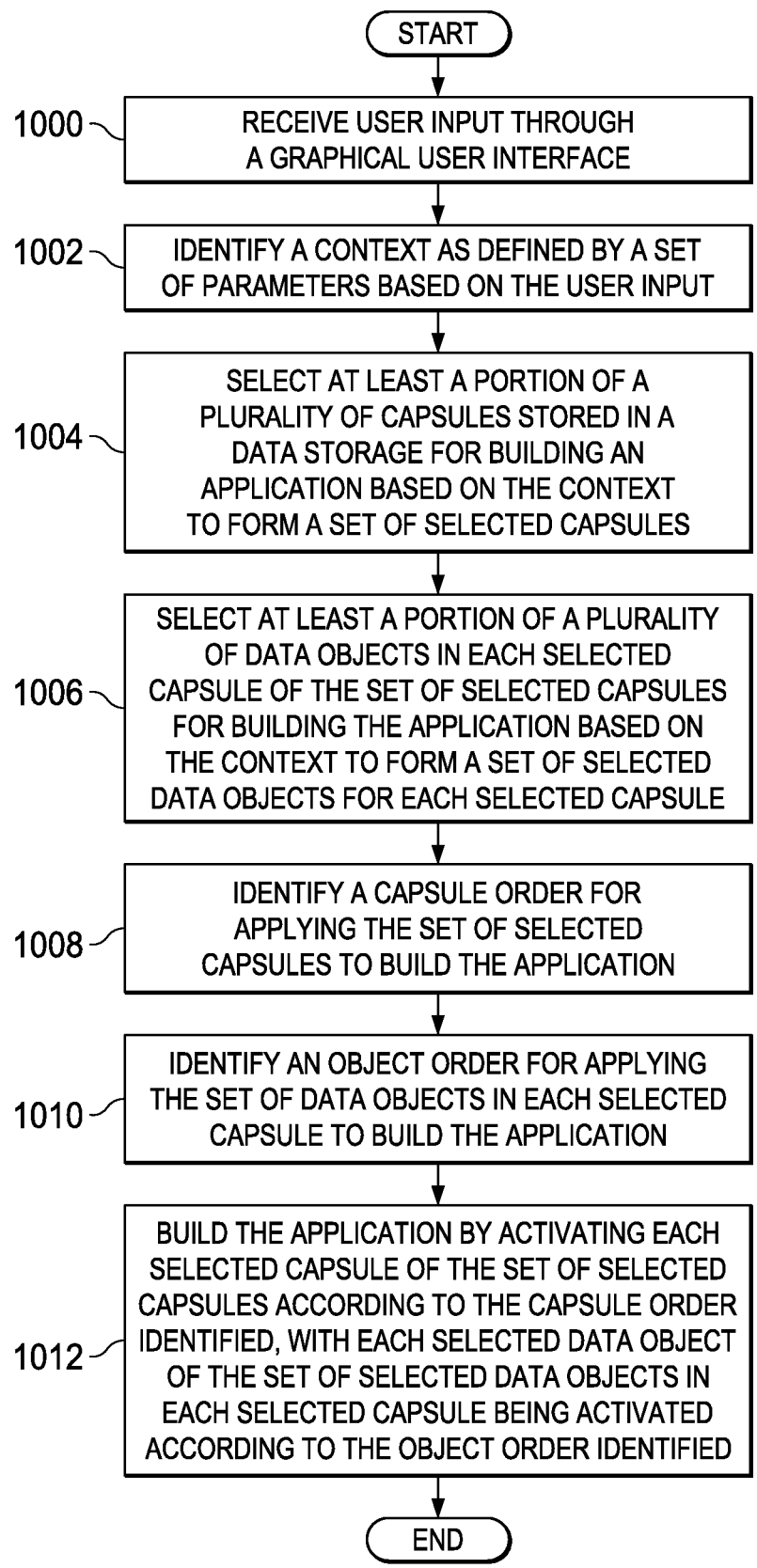
FIG. 10 is an illustration of a process for dynamically composing an application in the form of a flowchart in accordance with an illustrative embodiment.

With reference now to FIG. 10, an illustration of a process for dynamically composing an application is depicted in the form of a flowchart in accordance with an illustrative embodiment. The process illustrated in FIG. 10 may be used to compose a product, such as web application 206 in FIG. 2. Further, the process illustrated in FIG. 10 may be implemented using capsule activator 214 and composer 216 in FIG. 2 implemented in computer system 212 in FIG. 2.

The process may begin by receiving user input through a graphical user interface (operation 1000). In one illustrative example, the user input may comprise user log-in information, which may also be referred to as sign-on information. Next, a context as defined by a set of parameters is identified based on the user input (operation 1002). In some cases, in operation 1002, the context may also be determined based on the geographic location from which the user input is received. For example, an ISP (Internet Service Provider) number for the computing system used by the user may be used to identify one parameter for the context.

At least a portion of a plurality of capsules stored in a data storage is then selected for building an application based on the context to form a set of selected capsules (operation 1004). Next, at least a portion of a plurality of data objects in each selected capsule of the set of selected capsules is selected for building the application based on the context to form a set of selected data objects for each selected capsule (operation 1006).

A capsule order for applying the set of selected capsules to build the application is identified (operation 1008). An object order for applying the set of data objects in each selected capsule to build the application is identified (operation 1010). Operation 1008 and operation 1010 may be performed based on the context, based on a rule stored in a data object in one of the selected capsules, or both.

Thereafter, the application is built by activating each selected capsule of the set of selected capsules according to the capsule order identified, with each selected data object of the set of selected data objects in each selected capsule being activated according to the object order identified (operation 1012), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
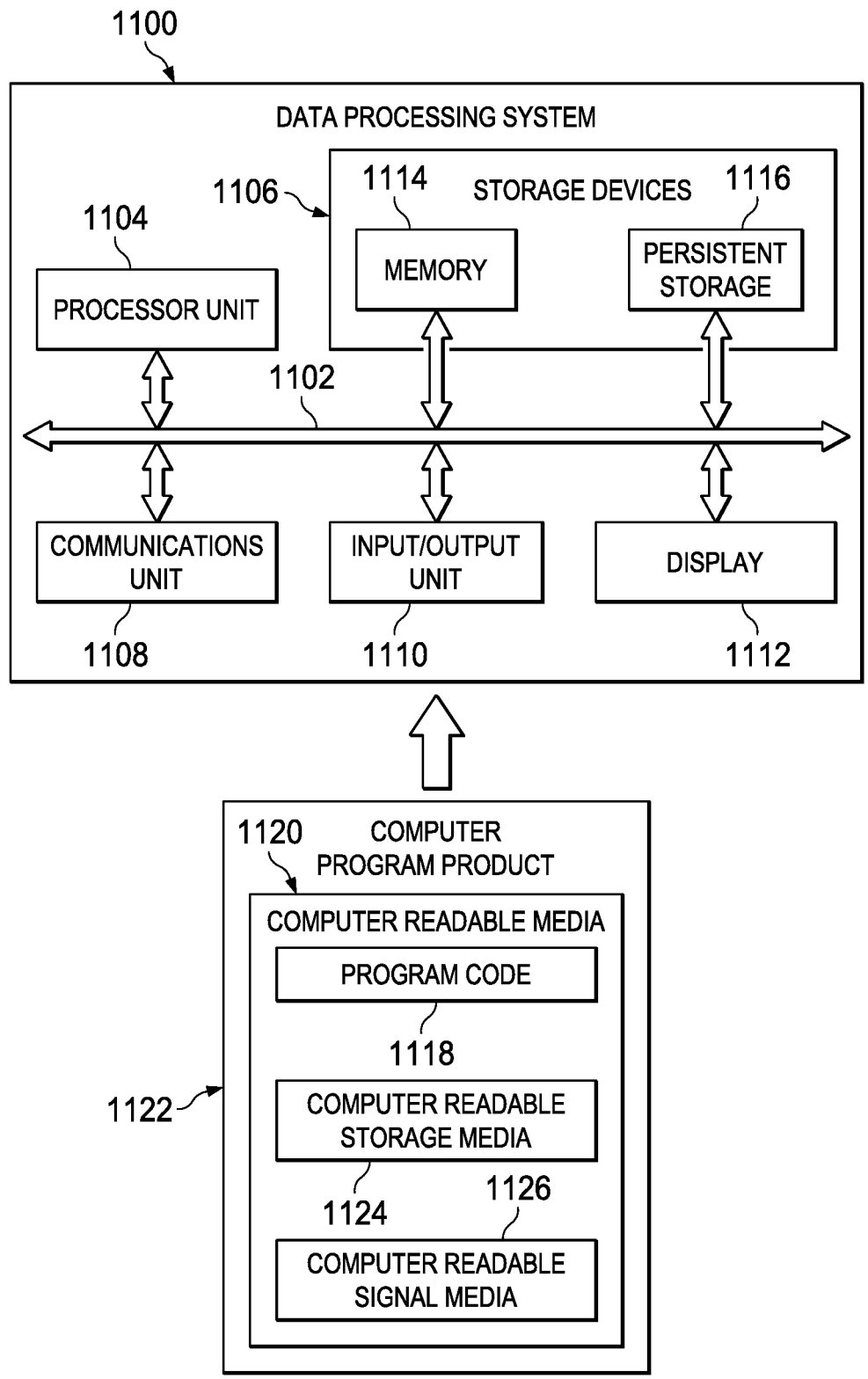
FIG. 11 is an illustration of a data processing system in the form of a block diagram in accordance with an illustrative embodiment.

Turning now to FIG. 11, an illustration of a data processing system in the form of a block diagram is depicted in accordance with an illustrative embodiment. Data processing system 1100 may be used to implement computer system 106 in FIG. 1, computer system 212 in FIG. 2, or both. As depicted, data processing system 1100 includes communications framework 1102, which provides communications between processor unit 1104, storage devices 1106, communications unit 1108, input/output unit 1110, and display 1112. In some cases, communications framework 1102 may be implemented as a bus system.

Processor unit 1104 is configured to execute instructions for software to perform a number of operations. Processor unit 1104 may comprise a number of processors, a multiprocessor core, and/or some other type of processor, depending on the implementation. In some cases, processor unit 1104 may take the form of a hardware unit, such as a circuit system, an application specific integrated circuit (ASIC), a programmable logic device, or some other suitable type of hardware unit.

Instructions for the operating system, applications, and/or programs run by processor unit 1104 may be located in storage devices 1106. Storage devices 1106 may be in communication with processor unit 1104 through communications framework 1102. As used herein, a storage device, also referred to as a computer readable storage device, is any piece of hardware capable of storing information on a temporary and/or permanent basis. This information may include, but is not limited to, data, program code, and/or other information.

Memory 1114 and persistent storage 1116 are examples of storage devices 1106. Memory 1114 may take the form of, for example, a random access memory or some type of volatile or non-volatile storage device. Persistent storage 1116 may comprise any number of components or devices. For example, persistent storage 1116 may comprise a hard drive, a flash memory, a rewritable optical disk, a rewritable magnetic tape, or some combination of the above. The media used by persistent storage 1116 may or may not be removable.

Communications unit 1108 allows data processing system 1100 to communicate with other data processing systems and/or devices. Communications unit 1108 may provide communications using physical and/or wireless communications links.

Input/output unit 1110 allows input to be received from and output to be sent to other devices connected to data processing system 1100. For example, input/output unit 1110 may allow user input to be received through a keyboard, a mouse, and/or some other type of input device. As another example, input/output unit 1110 may allow output to be sent to a printer connected to data processing system 1100.

Display 1112 is configured to display information to a user. Display 1112 may comprise, for example, without limitation, a monitor, a touch screen, a laser display, a holographic display, a virtual display device, and/or some other type of display device.

In this illustrative example, the processes of the different illustrative embodiments may be performed by processor unit 1104 using computer-implemented instructions. These instructions may be referred to as program code, computer usable program code, or computer readable program code and may be read and executed by one or more processors in processor unit 1104.

In these examples, program code 1118 is located in a functional form on computer readable media 1120, which is selectively removable, and may be loaded onto or transferred to data processing system 1100 for execution by processor unit 1104. Program code 1118 and computer readable media 1120 together form computer program product 1122. In this illustrative example, computer readable media 1120 may be computer readable storage media 1124 or computer readable signal media 1126.

Computer readable storage media 1124 is a physical or tangible storage device used to store program code 1118 rather than a medium that propagates or transmits program code 1118. Computer readable storage media 1124 may be, for example, without limitation, an optical or magnetic disk or a persistent storage device that is connected to data processing system 1100.

Alternatively, program code 1118 may be transferred to data processing system 1100 using computer readable signal media 1126. Computer readable signal media 1126 may be, for example, a propagated data signal containing program code 1118. This data signal may be an electromagnetic signal, an optical signal, and/or some other type of signal that can be transmitted over physical and/or wireless communications links.

The illustration of data processing system 1100 in FIG. 11 is not meant to provide architectural limitations to the manner in which the illustrative embodiments may be implemented. The different illustrative embodiments may be implemented in a data processing system that includes components in addition to or in place of those illustrated for data processing system 1100. Further, components shown in FIG. 11 may be varied from the illustrative examples shown.

Thus, the illustrative embodiments provide a method and apparatus for dynamically building applications. In one illustrative example, a method for dynamically building an application in real-time is presented. A computer system identifies a context as defined by a set of parameters based on user input. The computer system then selects at least a portion of a plurality of capsules based on the context to form a set of selected capsules. Further, the computer system selects at least a portion of a plurality of data objects in each selected capsule of the set of selected capsules based on the context to form a set of selected data objects for each selected capsule. Still further, the computer system identifies a capsule order for applying the set of selected capsules to build a product and an object order for applying the set of selected data objects in each selected capsule to build the application. Still yet further, the computer system activates each selected capsule of the set of selected capsules according to the capsule order identified to form a set of activated capsules, wherein each selected data object of the set of selected data objects in each selected capsule is activated according to the object order identified when each selected capsule is activated. Further, the computer system composes the application in real-time using the set of activated capsules. The application is tailored for a particular state based on the context.

Thus, the application is composed in real-time, or on-demand, based on user input. The capsules and data objects themselves do not need to be analyzed to identify any patterns that conform to pre-defined classes. Rather the user input is used to identify parameters that then determine which capsules to activate and which data objects of these selected capsules to use in building the application.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
    a computer system:
        identifying a set of parameters based on user input, wherein identifying the set of parameters comprises identifying a context as defined by the set of parameters;
        activating a portion of a plurality of capsules stored in a data storage to form a set of activated capsules based on the identified context, wherein the plurality of capsules includes a base capsule;
        selecting at least a portion of a plurality of data objects in each activated capsule to form a set of selected data objects for each activated capsule based on the context, wherein one or more objects of the set of selected data objects are divided among one or more of the activated capsules; and
        using the set of activated capsules and the base capsule to dynamically compose an application at a time of use by modifying the base capsule with each activated capsule in the set of activated capsules in an identified order of modification of the set of activated capsules and an identified order of modification of the set of selected data objects, determined based on the set of parameters, wherein the application is a web application specifically tailored for a particular state based on the set of parameters, and the application and the plurality of capsules take up a reduced amount of memory space compared to storing code for a plurality of versions of the application for a plurality of states based on the context.

2. The method of claim 1, wherein the base capsule and the plurality of capsules enable dynamically composing the application in real-time for the plurality of states.

3. The method of claim 1, wherein dynamically composing the application in real-time comprises:
    defining a first layer for use in composing the application using a first capsule in the set of activated capsules in which the base capsule is modified by first data objects in the first capsule.

4. The method of claim 3, wherein dynamically composing the application in real-time further comprises:
    defining a second layer for use in composing the application using a second capsule in the set of activated capsules in which the first layer is modified by second data objects in the second capsule.

5. The method of claim 4, wherein dynamically composing the application in real-time further comprises:
    defining a third layer for use in composing the application using a third capsule in the set of activated capsules in which the second layer is modified by third data objects in the third capsule.

6. The method of claim 1, wherein dynamically composing the application in real-time comprises:
    defining a chain of layers for use in composing the application using the base capsule and the set of activated capsules, wherein a layer in the chain of layers is defined using one capsule that inherits at least one other capsule.

7. The method of claim 1, wherein activating the portion of the plurality of capsules comprises:
    activating at least one of a core capsule, a geographic region capsule, a user capsule, or a role capsule.

8. The method of claim 1 further comprising the computer system:
    displaying a graphical user interface on a display system based on the application that is composed using the base capsule and the set of activated capsules.

9. The method of claim 1, wherein activating the portion of the plurality of capsules comprises:
    selecting at least a portion of the plurality of capsules based on the context to form a set of selected capsules.

10. The method of claim 9, wherein activating the portion of the plurality of capsules further comprises:
    selecting at least a portion of a second plurality of data objects in each selected capsule of the set of selected capsules based on the context to form a second set of selected data objects for each selected capsule.

11. The method of claim 10, wherein activating the portion of the plurality of capsules further comprises:
    identifying a capsule order for applying the set of selected capsules to build a product; and
    identifying an object order for applying the second set of selected data objects in each selected capsule to build the application.

12. The method of claim 11, wherein activating the portion of the plurality of capsules further comprises:
    activating each selected capsule of the set of selected capsules according to the capsule order identified, with each selected data object of the second set of selected data objects in each selected capsule being activated according to the object order identified.

13. The method of claim 1 further comprising the computer system:
    displaying the application in a graphical user interface in a display system.

14. The method of claim 13 further comprising the computer system:
    caching a display format for display.

15. A method for dynamically building an application in real-time, the method comprising:
    a computer system:
        identifying a context as defined by a set of parameters based on user input;
        selecting at least a portion of a plurality of stored capsules based on the context to form a set of selected capsules;
        selecting at least a portion of a plurality of data objects in each selected capsule of the set of selected capsules based on the context to form a set of selected data objects for each selected capsule, wherein one or more objects of the set of selected data objects are divided among one or more of the selected capsules;

identifying a capsule order for applying the set of selected capsules to build a product, and an object order for applying the set of selected data objects in each selected capsule to build the application; and dynamically composing the application in real-time at a time of use, using a base capsule and modifying the base capsule of the plurality of stored capsules by the set of selected data objects in each selected capsule in the set of selected capsules in the capsule order and the object order, wherein the application is a web application tailored for a particular state based on the context.

16. An apparatus comprising:

a data storage that stores a plurality of capsules; and a computer system that:

identifies a set of parameters based on user input;

activates a portion of the plurality of capsules stored in the data storage to form a set of activated capsules based on a context of the set of parameters, wherein the set of parameters defines the context for use in selecting which capsules of the plurality of capsules are to be activated;

selecting at least a portion of a plurality of data objects in each activated capsule to form a set of selected data objects for each activated capsule based on the context, wherein one or more objects of the set of selected data objects are divided among one or more of the activated capsules;

determines an order in which each activated capsule in the set of activated capsules and an order in which each of the set of selected data objects are applied to form an application based on the set of parameters; and dynamically composes the application, in real-time at a time of use, using a base capsule as modified by each activated capsule in the set of activated capsules in the determined orders wherein the application is a web application, and the application and the plurality of capsules take up a reduced amount of memory space compared to storing code for a plurality of versions of the application for a plurality of states based on the context.

17. The apparatus of claim 16, wherein the plurality of capsules comprises:

a plurality of core capsules;
a plurality of geographic region capsules;
a plurality of user capsules;
a plurality of role capsules; and
a plurality of customization capsules.

18. The apparatus of claim 16, wherein a capsule in the plurality of capsules comprises:

a plurality of data objects.

19. The apparatus of claim 16, wherein the plurality of capsules comprises at least one of:

a plurality of core capsules;
a plurality of geographic region capsules;
a plurality of user capsules;
a plurality of role capsules; or
a plurality of customization capsules.

20. The apparatus of claim 16 further comprising the computer system having a display system, and the computer system displays the application in a graphical user interface on the display system.

* * * * *